(12) United States Patent
Tsang et al.

(10) Patent No.: US 7,641,046 B2
(45) Date of Patent: Jan. 5, 2010

(54) WATER-RESISTANT COMBINATION CASE FOR HANDHELD ELECTRONIC DEVICES

(76) Inventors: Chun Chee Tsang, Room 2812, Metro Plaza, Tower II, 223, Hing Fong Road, Kwai Fong, Hong Kong (CN); Fai Wing Luk, 22/F, Flat J-L, Blk 2 Golden Dragon Centre, 161-170 Tai Ling Pai Road, Kwai Chung, Kowloon, Hong Kong (CN)

( * ) Notice: Subject to any disclaimer, the term of this patent is extended or adjusted under 35 U.S.C. 154(b) by 499 days.

(21) Appl. No.: 11/545,307

(22) Filed: Oct. 10, 2006

(65) Prior Publication Data

US 2008/0083631 A1 Apr. 10, 2008

(51) Int. Cl.
*B65D 85/00* (2006.01)
*A45F 5/00* (2006.01)

(52) U.S. Cl. .................. 206/320; 206/305; 224/191; 224/665; 224/930

(58) Field of Classification Search .............. 206/305, 206/320; 224/196, 197, 665–670, 930, 191; 361/679.3
See application file for complete search history.

(56) References Cited

U.S. PATENT DOCUMENTS

| | | | | |
|---|---|---|---|---|
| 5,850,754 A | * | 12/1998 | Dobbins | 206/305 |
| 6,029,871 A | * | 2/2000 | Park | 224/197 |
| 6,445,577 B1 | * | 9/2002 | Madsen et al. | 206/320 |
| 6,536,589 B2 | * | 3/2003 | Chang | 206/320 |
| 6,752,299 B2 | * | 6/2004 | Shetler et al. | 224/197 |
| 6,786,372 B2 | * | 9/2004 | Enkerlin et al. | 224/196 |
| 6,905,051 B2 | * | 6/2005 | Chee | 224/197 |
| 2005/0115999 A1 | * | 6/2005 | Johnson | 224/930 |
| 2006/0175370 A1 | * | 8/2006 | Arney et al. | 224/930 |

* cited by examiner

*Primary Examiner*—Bryon P Gehman
(74) *Attorney, Agent, or Firm*—Patricia M. Mathers

(57) ABSTRACT

Combination case for providing a versatile protective case for a handheld device, such as a PDA. The combination case has a rigid inner shell that attaches to an outer shell with a mounting plate. The handheld device is inserted into the rigid inner shell, which is then attached to the rear panel of the outer shell. The rigid inner shell is a three-sided shell that holds the handheld device and allows free access to the LCD display and operational components on the device when the outer shell is open. A soft inner shell may be used instead of the rigid inner shell. This soft inner shell attaches to the outer shell with the mounting plate and provides a water-resistant enclosure for the device.

5 Claims, 3 Drawing Sheets

WATER-RESISTANT COMBINATION CASE FOR HANDHELD ELECTRONIC DEVICES

BACKGROUND INFORMATION

1. Field of the Invention

The invention relates to the field of protective cases for handheld devices. More particularly, the invention relates to a case that protects the encased device from moisture and water and allows operation of the device while encased therewithin.

2. Description of the Prior Art

Small, handheld electronic devices, such as a personal digital assistant (PDA), are very popular. Users rely on such devices throughout the day, and use them in indoor office and home locations, as well as at outdoors locations, and sometimes for extended periods of time. The devices may be used in harsh environments, such as on a factory shop floor, in the presence of damaging fumes or chemicals. The devices, thus, are often subjected to inclement weather, such as rain, snow, or hail, or other harsh environments. For this reason, users often carry their devices in protective cases.

There are many cases for PDAs and other such small, handheld devices. Most cases are not water-resistant, however, or, if they are, make it difficult or impossible to operate the device while it is encased in the water-protective case.

What is needed, therefore, is a case that securely holds a small, handheld electronic device, particularly a PDA. What is further needed is such a case that protects the device from the environment. What is yet further needed is such a case that provides a water-resistant barrier, yet allows the user to operate the device while it is enclosed within the case.

BRIEF SUMMARY OF THE INVENTION

The invention is a combination protective case for an electronic handheld device comprising an inner protective shell and an outer protective shell. The inner shell is tightly secured to the outer protective shell by means of a mounting plate that is placed within the inner shell. The outer shell is ideally a form-rigid shell that protects the back panel and the front panel of the handheld device when it is closed. When it is open, it allows access to the operational components of handheld device.

The inner shell is a form-rigid shell that encases the sides and back of the handheld device. When the device is not in use, the front panel of the outer shell may be closed over the front of the device, thereby protecting it from inadvertent use or from damage, should it come into contact with other objects. This rigid inner shell is used with the outer shell in normal environments. Together, the two shells protect the handheld device from damage that may occur under normal circumstances. It may be necessary to protect the handheld device from harsh or damaging substances, including moisture. In such a case, a water-seal inner shell is used, together with the outer shell. The water-seal inner shell is ideally constructed as a pliable, transparent shell that, when attached to the outer shell, completely encases the handheld device and provides an adequate seal to prevent the ingress of moisture for some period of time at atmospheric pressure. This water-seal inner shell may be made of a silicon material or other suitable material, that is sufficiently flexible or pliable and transparent to allow the user to read the LCD display panel and actuate the operational components of the handheld device through the soft inner shell. The inner shell, whether the rigid inner shell or the water-seal inner shell, is attached to the outer shell by means of a mounting plate that is placed in the inner shell and fastened to the rear panel of the outer shell.

The outer shell has a double hinge at the top, so that the front panel is easily swung out of the way when the handheld device is being used. A snap closure or latch or other type of suitable closure may be provided on the front and rear panels of the outer shell, so that the combination case may be securely closed.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1:
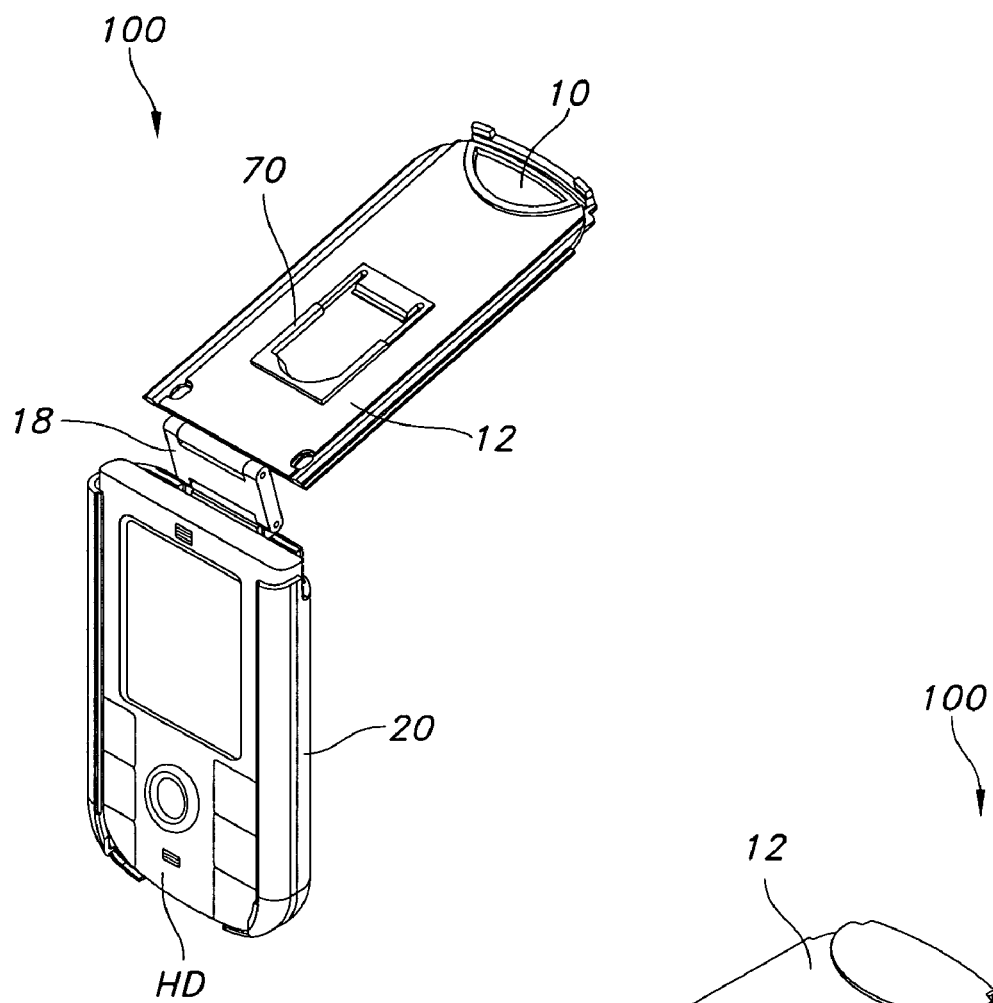
FIG. 1 is a perspective view of the combination case according to the invention, showing a handheld device inserted in the inner shell and a storage frame on the inside of the front outer case panel.
Figure 2:
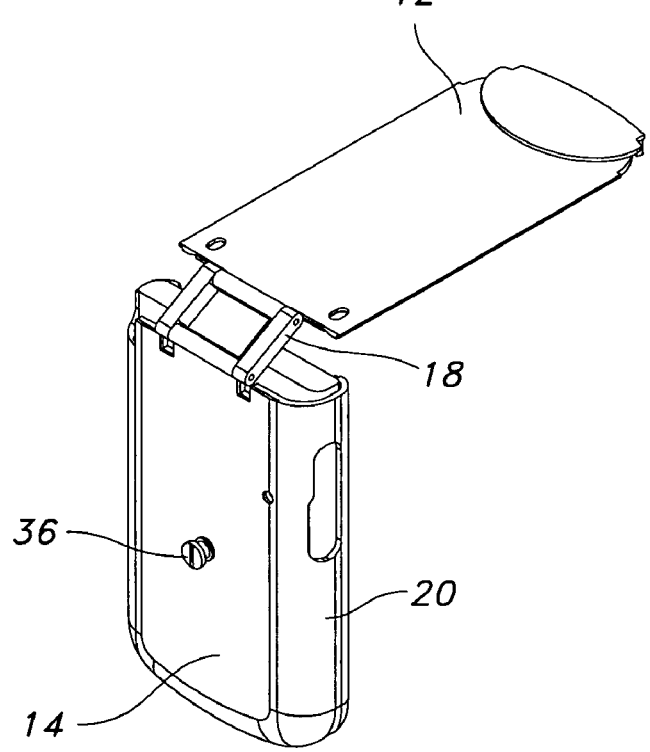
FIG. 2 is a perspective view of the combination case according to the invention, showing the handheld device inserted into the inner shell and a fastener on the rear outer case panel.
Figure 6:
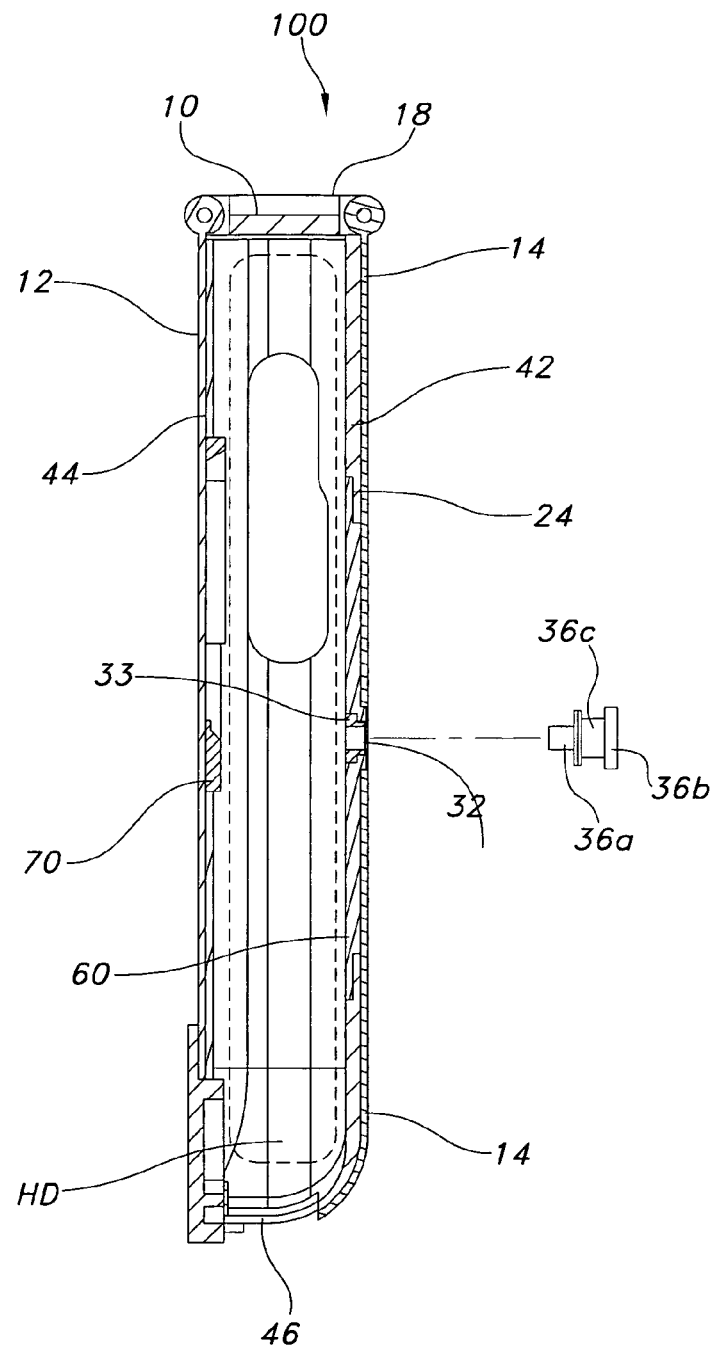
FIG. 6 is a cross-sectional view of the assembled, closed combination case, showing how the mounting plate secures the inner shell to the outer shell.

FIGS. 1, 2 and 6 show an assembled combination case 100 according to the invention, for protecting a handheld device HD. The combination case 100 comprises an outer shell 10 and an inner shell 20. The outer shell 10 is best constructed of a durable, rigid material, such as a metal, a hard plastic, or a hard rubber. In the preferred embodiment, the outer shell 10 is constructed of magnesium, which lends an elegant look while providing the rigidity and strength desired to protect the handheld device enclosed within. The outer shell 10 has a front panel 12 and a rear panel 14. Connecting the two panels 12 and 14 is a hinge link 18 that allows the front panel 12 to swing away from the front of the handheld device HD and out of the way of the user. In the embodiment shown, the hinge link 18 is hingedly connected to the front panel 12, as well as to the rear panel 14. The hinge link 18 allows the user to fold the front panel 12 back toward or up against the rear panel 14 of the outer shell. A storage frame 70 may also be provided on the outer shell 10, thereby providing a convenient means for the user to store one or more extra memory cards. In this embodiment, the storage frame 70 is provided on an inner surface of the front panel 12, although it is possible to provide the storage frame on other surfaces of the outer shell 10. The storage frame 70 may be constructed to store an SD memory card or other type of memory card.

Figure 3A:
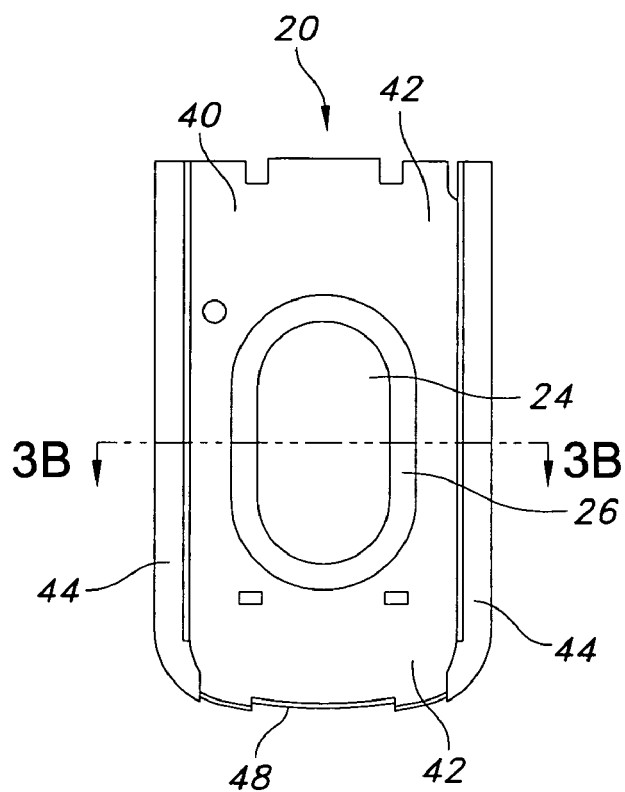
FIG. 3A is a front plane view of the rigid inner shell.
Figure 3B:
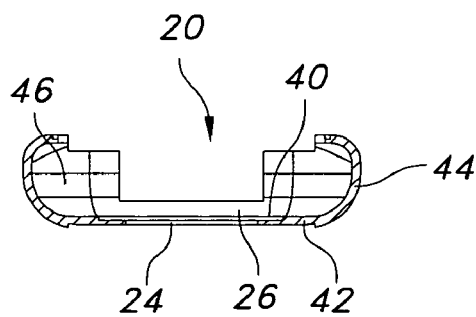
FIG. 3B is a cross-sectional view of the rigid inner shell of FIG. 3A.

FIGS. 3A and 3B are planar views of one embodiment of the inner shell 20. The inner shell 20 may be either a rigid inner shell 40 or a water-resistant shell 50 (discussed below). The rigid inner shell 40 is a three-sided or U-shaped shell having a rear inner shell panel 42, side walls 44, which together form a channel 46 for receiving the handheld device HD, and a support surface 48. An aperture 24 is formed in the rear inner shell panel 42. In the embodiment shown, an inner-shell recess 26 is formed around the aperture 24, to provide a seating to hold the mounting plate 60 in place. This rigid inner shell 40 is dimensioned such that the handheld device HD is slidably insertable into the channels 46. The channels 46 and the support surface 48 securely retain the handheld device HD.

Figure 4A:
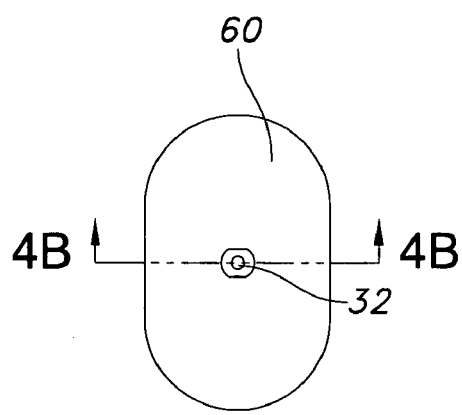
FIG. 4A is a plane view of the mounting plate.
Figure 4B:
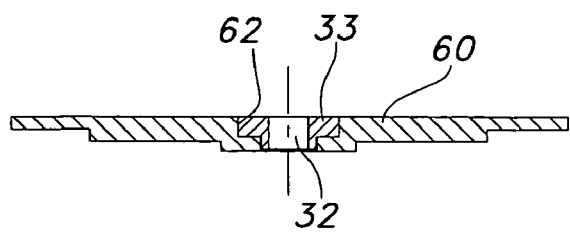
FIG. 4B is a cross-sectional view of the mounting plate of FIG. 4A.

FIGS. 4A and 4B illustrate the mounting plate 60. A throughbore 32 is provided in the approximate center of the mounting plate 60 and also in the rear panel 14 (shown in FIG. 6). This mounting plate is 60 is dimensioned to fit into the recess 26 and cover the aperture 24 described above. A threaded female fastener 33 is incorporated into the mounting plate 60, either as a separate part that is fixedly attached to or as an integrated feature of the mounting plate 60. In the embodiment shown, the fastener 33 is a nut that is adhesively affixed in a recess 62, whereby the recess 62 is shaped to accommodate the shape of the nut and to further prevent it from rotating.

Figure 5:
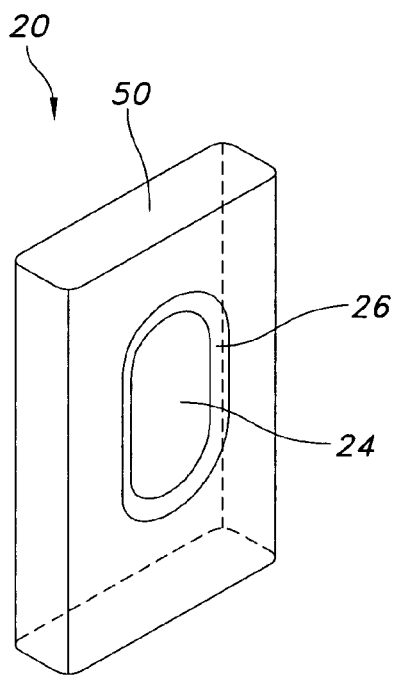
FIG. 5 is a perspective view of the soft inner shell.

FIG. 5 shows the water-resistant shell 50 from the rear. The water-resistant shell 50 is a soft shell, preferably constructed of a transparent and pliant material, such as silicon. This water-resistant shell 50 also has an aperture 24 that allows it to be attached to the outer shell 10 by means of the mounting plate 60 in the same manner as described above with the rigid inner shell 40 and the mounting plate 60, and as illustrated below in FIG. 6. Depending on the particular elastic properties of the material used for the water-resistant shell 50, the aperture 24 may be stretchable, to accommodate the size of the handheld device HD as it is inserted into the soft inner shell. In another embodiment, the material surrounding the aperture 24 may be folded, so as to open up to receive the handheld device HD and the mounting plate 60 and to then fold over the mounting plate 60 such that the mounting plate 60 completely covers the aperture 24. FIG. 6 shows the rigid inner shell 40 fastened to the outer shell 10, but it is understood that the soft inner shell 50 is fastened to the outer shell 10 in the same manner.

FIG. 6 illustrates a male fastener 36 that is provided to secure the inner shell 20 and the mounting plate 60 to the outer shell 10. Ideally, the male fastener 36 is a post having a threaded shaft 36A, a fastener head 36B, and a post section 36C. The threaded shaft 36A is insertable into the rear panel 14, as shown in FIG. 6. The post section 36C is designed to fit into a groove on a corresponding belt clip (not shown), as a means of suspending the combination case 100 from the belt clip. The male fastener 36 may also be a relatively flat fastener if the combination case 100 is to be used without a belt clip. When the male fastener 36 is properly secured by the female fastener 33, the mounting plate 60 is pulled tight against the outer shell 10, thereby tightly securing the perimeter around the aperture 24 of the inner shell 20, be it the rigid inner shell 40 or the water-resistant shell 50, between the mounting plate 60 and the outer shell 10. The fit of the inner shell 20 up against the mounting plate 60 and the outer shell 10 is tight enough that, when the soft inner shell 50 is used, the combination case 100 provides a water-resistant enclosure for the handheld device HD. The front panel 12 of the outer shell 10 is closable over the front of the handheld device HD and is secured by means of a snap closure. pawl catch, or some other suitable closure means.

It is understood that the embodiments described herein are merely illustrative of the present invention. Variations in the construction of the combination case may be contemplated by one skilled in the art without limiting the intended scope of the invention herein disclosed and as defined by the following claims.

What is claimed is:

1. Protective case comprising:
    an outer shell, an inner shell, a mounting plate that fits within said inner shell, and a fastener for fastening said mounting plate to said outer shell, thereby securing said inner shell to said outer shell;
    wherein said fastener includes a male fastener and a mating female fastener, said outer shell has a rear panel with a first throughbore and said mounting plate includes said female fastener, and said inner shell has a rear face with an aperture therein and said mounting plate is dimensioned to cover said aperture, and wherein, when said mounting plate is placed within said inner shell, said male fastener is insertable through said first throughbore and is securable in said female fastener, so as to clamp said mounting plate sealingly against said aperture and said rear face of said inner shell against said outer shell.

2. The protective case of claim 1, wherein said inner shell is a form-rigid shell having an open front face, said form-rigid shell being adapted to receive and retain a device and to provide access to operational features on the device.

3. The protective case of claim 2, wherein said form-rigid shell has a rear face and two sides that form channels adapted to receive the device, and a bottom face for preventing the device from slipping out of said form-rigid shell.

4. The protective case of claim 2, wherein said inner shell is a soft shell that is adapted to receive the device and said mounting plate through said aperture and, when said mounting plate is fastened to said outer shell, so as to form a water-resistant enclosure for the device within said inner shell.

5. The protective case of claim 1, wherein said male fastener has a shaft, a post head and a post section that are adapted to suspendingly couple said male fastener to a belt clip.

* * * * *